March 17, 1942  E. J. HOUDRY  2,276,307
CATALYTIC CONVERTER
Filed April 18, 1938  5 Sheets-Sheet 1

INVENTOR
EUGENE J. HOUDRY
BY
Ira L. Nickerson
ATTORNEY

March 17, 1942.  E. J. HOUDRY  2,276,307
CATALYTIC CONVERTER
Filed April 18, 1938    5 Sheets-Sheet 3

INVENTOR
EUGENE J. HOUDRY
BY
Ira L. Nickerson
ATTORNEY

March 17, 1942.   E. J. HOUDRY   2,276,307
CATALYTIC CONVERTER
Filed April 18, 1938   5 Sheets-Sheet 4
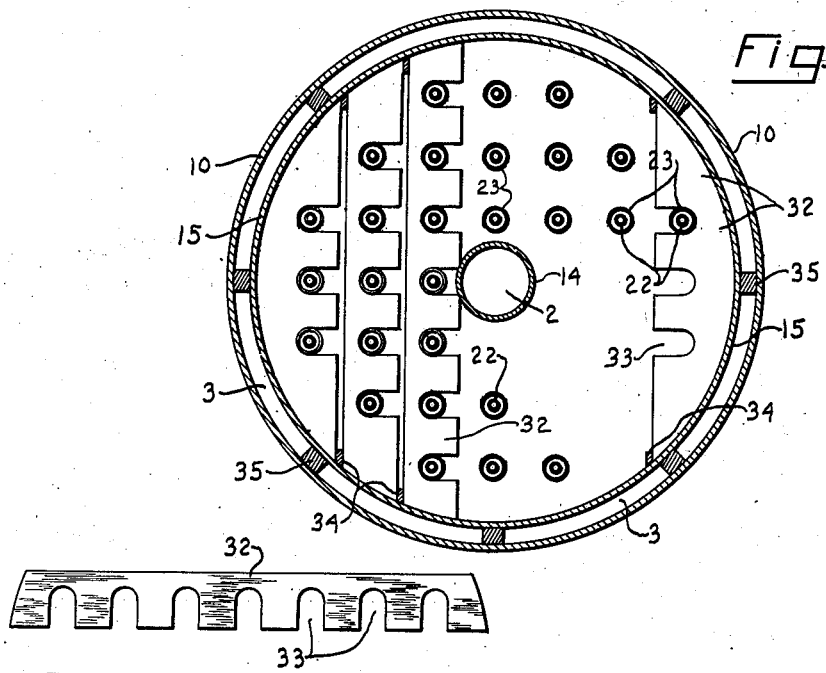
Fig. 4.
Fig. 5.
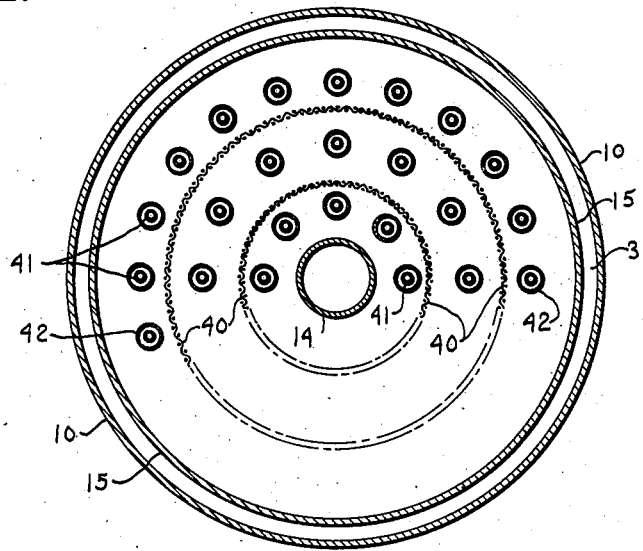
Fig. 9.
INVENTOR
EUGENE J. HOUDRY
BY
Ira L. Nickerson
ATTORNEY

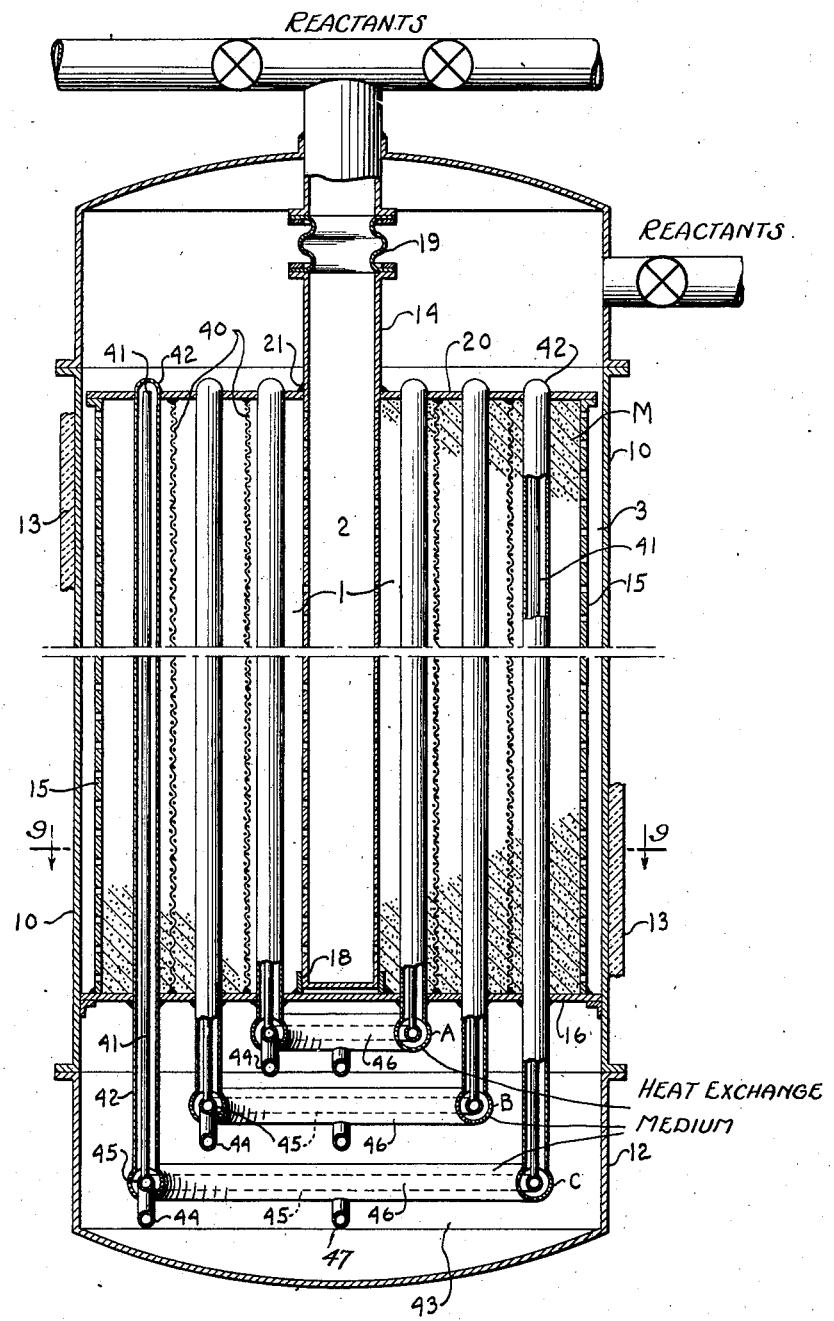

Patented Mar. 17, 1942

2,276,307

UNITED STATES PATENT OFFICE 2,276,307

CATALYTIC CONVERTER

Eugène J. Houdry, Haverford, Pa., assignor to Houdry Process Corporation, Wilmington, Del., a corporation of Delaware Application April 18, 1938, Serial No. 202,689

2 Claims. (Cl. 23—288)

This invention relates to endothermic and exothermic reactions and includes the treatment, modification, conversion or transformation of fluids which may involve the chemical reactions of decomposition, synthesis, metathesis, hydrogenation, etc. More particularly, it is connected with reactions effected in the presence of a contact mass which may have absorbent and/or adsorbent qualities, be a mere spreading material, enter into or catalytically promote a reaction.

It is the principal object of the present invention to provide a method and apparatus for efficiently controlling the factors or conditions of a reaction. Another object is to maintain a reaction of approximately uniform intensity throughout. Another object is to improve the distribution of reactants in a reaction chamber. Another object is to provide a reaction chamber having zones of the same, varying or differing reaction intensities or characteristics. Other objects will become apparent as the detailed description progresses.

In the transformation or modification of organic materials including hydrocarbons to obtain other or better products in the same or different boiling range, the efficiency of the reaction is dependent upon the nature of the reaction and the particular or selected operating factors or conditions, which may include the temperature and pressure conditions obtaining within a reaction chamber, the rate of flow or velocity of the fluid in traversing the chamber, and when the reaction is effected in the presence of a contact mass, the nature of the mass as well as its depth or path of flow therethrough. In the latter type of reaction, when the depth of bed or path of flow through the mass is considerable, as of the order of two feet or more, a non-uniform reaction may take place, since the fresh hydrocarbon fluid at the time of its initial contact with the mass usually contains the greatest concentration of reacting ingredients over which the mass has the greatest influence, and tends to produce in the initial stage of the reaction a high yield of desired product and proportionate yields of coke and gas. As the reactant material continues to pass through the remaining mass, its content of reacting ingredients tends to decrease or to be changed to more and more refractory forms and to produce substantially lower yields of the desired product with corresponding modification of coke and gas production during the successive stages of the reaction.

By controlling and correlating the several factors of such a reaction in accordance with the present invention, it is possible to produce a reaction which will give or approach an optimum yield of the desired product and a proportionately small amount of waste products, as well as an approximately uniform distribution of tar and coky deposit on the contact mass which lessens the problem of regenerating the mass by oxidation, since the mass may be maintained throughout at an approximately even temperature and eliminate the possibility of overheating and destroying or lessening the activity of certain portions thereof. For example, the velocity at which a reactant fluid traverses a reaction chamber or the time of contact of the fluid with the mass, may be varied during the successive stages of a reaction to provide a uniform and complete reaction. Or the activity of the contact mass itself may be varied in different portions of the reaction chamber, and this, along with varying the velocity of the fluid or time of contact with the mass, to produce a better reaction. Along with the control of these several conditions may be included the variation of the temperature of portions or zones of the reaction chamber or contact mass to produce more efficacious results.

In order to illustrate the invention concrete embodiments of apparatus are shown in the accompanying drawings in which:

Fig. 4 is a similar view on the line 4—4 of Fig. 2.

Figs. 5, 6 and 7 are views in detail.

Fig. 8 is a longitudinal sectional view of a second modification of the invention; and Fig. 9 is a horizontal sectional view on the line 8—8 Fig. 8.

Figure 1:
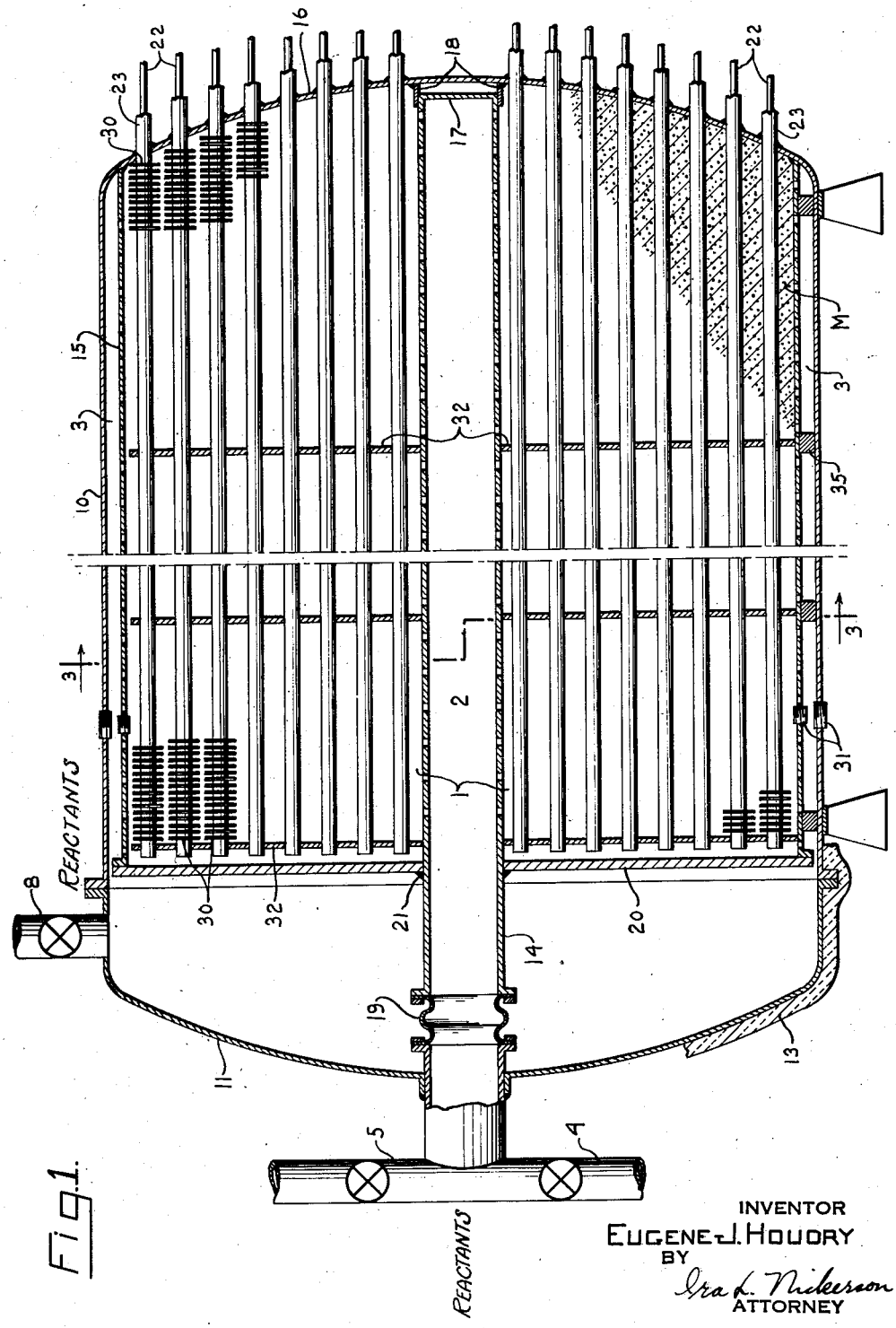
Fig. 1 is a longitudinal vertical sectional view of a horizontal type converter disclosing the main embodiment of the invention.
Figure 2:
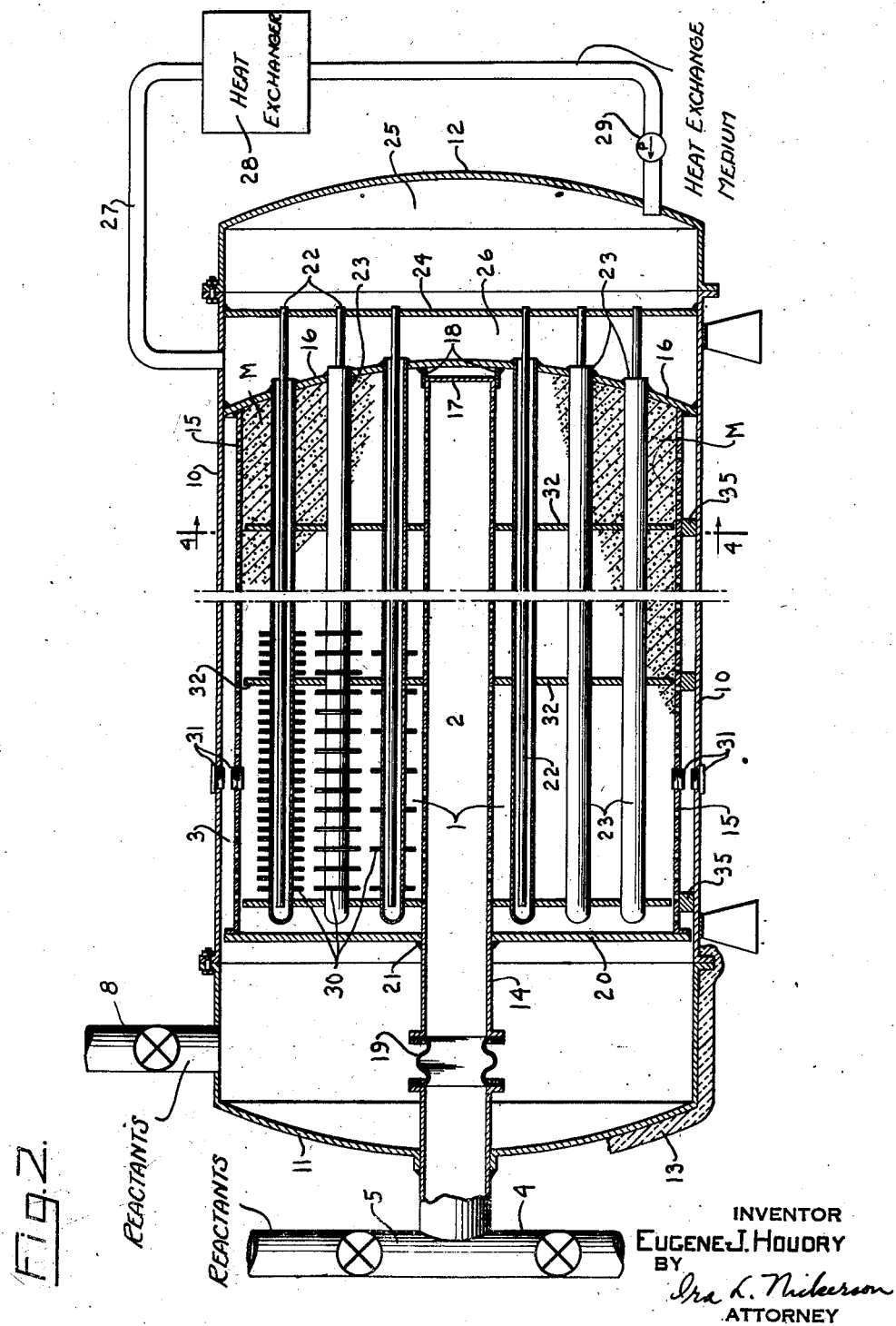
Fig. 2 is a view similar to Fig. 1 of a modification with portions shown in detail.

In Figs. 1 and 2 of the drawings are shown similar types of converters adapted particularly for use in the catalytic production of low boiling hydrocarbons from hydrocarbons of a higher boiling series but they are to be considered only as exemplary of the means for carrying out the objects of the invention. The converters in these figures each comprise a casing 10 and detachable end cover 11 with heat insulating material 13 for protection against heat losses. The casings are interiorly divided to form a reaction chamber 1 and concentric inner and outer chambers 2 and 3 for receiving reaction fluid and products of reaction. The respective chambers are formed by partitions 14 and 15 which will preferably take the form of perforated tubular members concentrically disposed within casing 10. The casings are provided at one end with a transverse plate 16 and as shown in Fig. 1 it may be formed integral therewith or, as in Fig. 2, may be welded or otherwise suitably secured to the casing and forms with the partition members a closure for the several chambers. One end of the inner member 14 may be closed at 17 and slidably associated with a spring ring 18 fixed to plate 16 while the other end extends outwardly of the end cover 11 and is connected with valved conduits 4 and 5 for feeding fluid to or receiving fluid from the inner chamber 2. The member 14 may be provided with a flexible joint 19 to allow for contraction and expansion due to temperature changes within the converter. The outer tubular member 15 has one end rigidly secured to the transverse plate 16 while the other end is sealed by means of a cover plate 20 which is movable within the casing and may be of sufficiently small diameter to permit the ready passage of fluid from the chamber 3. This plate 20 is centrally apertured to receive the tubular member 14 to which it is rigidly secured as at 21.

The reaction chamber 1 is adapted to contain a contact mass M of any suitable material capable of effecting the desired reaction but preferably in the form of bits, fragments or molded pieces to facilitate movement of reactants therethrough. For the purpose of maintaining the desired reaction temperature within the mass, heat exchange units of the return flow type preferably extend longitudinally of the chamber and comprise inner and outer nested tubes 22 and 23 respectively. The tubes extend through apertures in the plate 16 to which the outer tubes may be secured adjacent their open ends, while the inner tubes extend beyond the plate 16. To insure the desired degree of heat transfer the heat exchange units may be provided with any suitable type of heat conducting elements but in order to expeditiously charge and discharge the reaction chamber with the contact material, it is preferred to use transverse fins 30 on the outer tubes, as shown on portions of the tubes only for purposes of clarity. Capped openings 31 may be provided for the purpose of charging and discharging the converter and these may be conveniently located in suitable number at the top and bottom of the converter.

Figure 3:
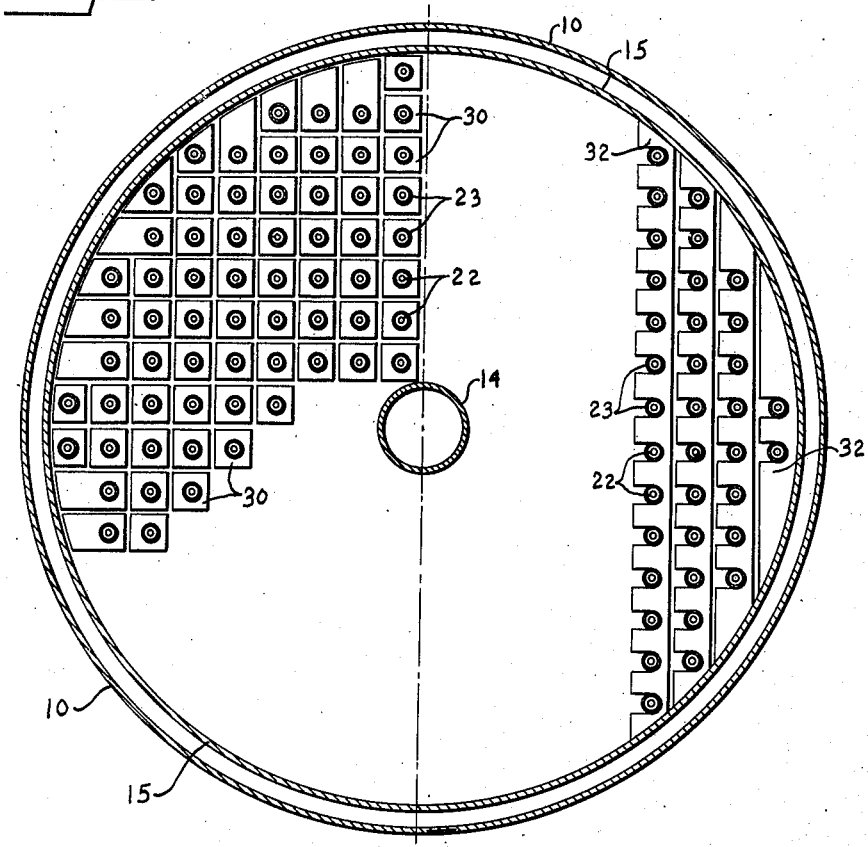
Fig. 3 is a transverse sectional view on the line 3—3 of Fig. 1.
Figure 6:
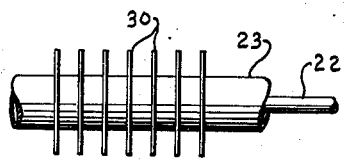
Figure 7:
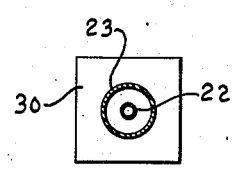

For the purpose of eliminating sagging and maintaining the heat exchange units in accurate alignment, a series of spacers 32 clearly shown in Figs. 3 and 4 extend transversely of the reaction chamber and are provided with slots 33 to receive the outer tubes of the units. In assembling the tubes and spacing elements in the converter, it will be necessary, because of the particular fin arrangement on the tubes, to progressively mount them from opposite portions of the chamber towards the middle. The spacing elements may be fixed to the wall of the chamber by suitable studs or clips 34 (Fig. 4) and held rigidly against displacement. Several rows of these spacers may be disposed within the reaction chamber and suitable braces 35 may be positioned between the outer wall of this chamber and the casing to provide a more rigid structure.

In Fig. 2 the nested heat exchange units are shown in conjunction with a heat exchange manifolding system. The inner members 22 are maintained in fixed position by means of an apertured plate 24 which forms with an end cover plate 12 an inlet manifold 25 for feeding a heat exchange medium to the inner tubes and with the end plate 16 an outlet chamber 26 for receiving the medium from the tubes 23 after circulation through the tubes. A return pipe 27 connects the chambers 25 and 26, and is provided with a suitable heat exchanger 28 for modifying the temperature of the medium, and a pump 29 for returning the medium for recirculation. The heat exchange fins 30 may be non-uniformly spaced on the tubes in different portions or zones of the mass if it is desired to vary the temperature thereof during a reaction. As shown, the heat conducting fins are spaced farther apart near the inner chamber 2 and progressively more closely spaced toward the outer chamber 3 to provide an increasing amount of heat transfer toward the outer chamber. This fin arrangement is preferred for some reactions, however it is within the scope of the invention to reverse the fin set-up and provide, for increased heat transfer toward the inner chamber or if no temperature variation is desired within the mass the fins may be spaced equally as shown in Fig. 1.

As disclosed, the converters are cylindrical in cross-section and this shape is preferred since it is readily adaptable to carry out the invention. If the reaction is endothermic, the hydrocarbon fluid may be admitted through valved conduit 4 to the inner chamber 2 at the desired rate and at or near the temperature required to support the reaction and then passed through the numerous perforations in the chamber wall where it contacts the mass at its greatest velocity because of the small volume of mass adjacent the perforations. The initial contact with the mass, however, produces a high yield of desired product such as gasoline due to the low refractory state of the fresh fluid. After this initial contact with the mass, the fluid expands radially therethrough at a progressively decreasing speed and a gradually increasing time of contact with the mass due to the increasing volume of mass to be traversed resulting in a gradual and progressive increase in time of contact to compensate at least in part for changes in the charge resulting from the reaction, thereby to adjust the intensity of the conditions or factors of reaction which affect the charge as it passes through the mass and becomes more and more refractory, thus producing a more uniform or constant reaction. Meantime the temperature of the mass and of the reaction is suitably controlled by the heat exchange units. The reaction products pass through the perforations in the outer wall of the reaction chamber to chamber 3 and outwardly through a valved conduit 8. If it is desired or necessary, the reaction intensity may be modified so as to be still more uniform by gradually increasing the degree of heat exchange from the distributor or inlet chamber towards the outlet chamber. One arrangement for doing this is by supplying the heat exchange medium at higher temperatures as exit chamber 3 is approached and another arrangement comprises spacing the fins farther apart on the heat exchange conduits 23 near the inlet and more closely together on the conduits 23 toward the outlet, thus producing more heat exchange surface and an increased temperature to aid the reaction as the fluid becomes more refractory.

When the reaction is exothermic as in the regeneration of the mass by oxidation to remove contaminating deposits, air or other regenerating media at suitable temperatures may be fed to chamber 2 by the valved conduit 5 and the products or fumes discharged by the conduit 8 in the same manner as the endothermic reaction. The medium may be fed to the chamber at or near the temperature necessary to support the reaction in which case the excess heat of the reaction will be removed by the heat exchange units. On the other hand the regenerating medium may be utilized to remove at least a part of the excess heat from the mass in which case it will be fed to the chamber at a temperature somewhat below that of the reaction and the reaction may be maintained approximately uniform or constant throughout due to the gradual decrease in velocity of the fluid and its time of contact as it traverses the mass, temperature adjustment and control being effected by the heat exchange medium and/or by the non-uniform arrangement of the fins on the heat exchange tubes.

Certain reactions may if desired be carried out in the reverse manner by admitting the fluid to the outer chamber 3 and passing the same radially through the mass M and the reaction products discharged from chamber 2 through one of the valved conduits 4 or 5, or in a slightly modified arrangement (not shown) the fluid may be admitted at or near the center of the mass to pass radially towards the inlet and outlet chambers and the reactions maintained substantially uniform throughout, due to the continuing advantageous relationship existing among the various reaction factors or condition as the fluid traverses the mass.

The converter shown in Fig. 8 is adapted for vertical disposition and parts thereof similar to Figs. 1 and 2 will be indicated by the same numerals. Features disclosed in any of figures may be substituted for or added wholly or in part to the other figures within the scope of the invention. This converter is likewise divided into a plurality of intercommunicating chambers 1, 2, and 3 by perforated tubular members 14 and 15 concentrically disposed within the casing. The inner member 14 is closed at one end which is slidably disposed in a spring ring 18 fixed to the transverse plate 16 and adjacent its other end is provided with a flexible joint 19. The outer tubular member 15 has one end fixed to the transverse plate 16 and the other end is sealed by means of a transverse cover plate 20 which is slidable within the converter casing and centrally apertured to receive the inner member 14 to which it is rigidly fixed as at 21.

The reaction chamber 1, formed between the concentric tubular partitions 14 and 15, is adapted to contain a contact mass and as shown in Figs. 4 and 5, provision is made for separating the mass into a plurality of reaction zones which may contain the same or different contact material depending upon the particular reaction desired. For this purpose the chamber is partitioned by a plurality of members 40, which may be apertured, and disposed between the transverse plates 16 and 20 to which they are rigidly secured. These partitioning members may take the form of reticulated screens to permit the fluid to pass between the several reaction zones while allowing a limited amount of contraction and expansion according to temperature conditions within the chamber.

Heat exchange units of the return flow variety comprising inner and outer nested members 41 and 42 respectively extend through the mass and through the transverse plates 16 and 20 and the outer tubes may be secured to one of the plates as 16 by welding or otherwise. A plurality of separate heat exchange manifolds A, B and C are disposed in a chamber 43 formed at one end of the casing and each manifold is adapted to supply a medium to a group of heat exchange tubes for controlling the temperature of the mass. As shown, the manifolds A may be connected with a series of tubes located near the center of the converter while B and C connect with the tubes in the middle portion or zone of the mass and outer portion or zone respectively.

The manifolds may be provided with supply mains 44 for conveying fluid to the supply conduits 45 which are in communication with the inner heat exchange tubes 41, while the outer heat exchange tubes are connected to return tubes 46 of the manifolds having outlet members 47 leading to a heat exchanger and pump, not shown, for recirculating the medium. By providing separate manifolding chambers as described, the mass may be maintained at different temperatures in portions thereof or the zones of different catalytic mass may be maintained at different temperatures with or without the provision of heat exchange fins on the tubes. The contact mass may be charged to the reaction chamber according to the disclosure in Patent No. 2,079,630 to T. B. Prickett et al., filed September 12, 1934 and issued May 11, 1937, showing pipes extending through suitable openings in the casing and into the reaction chamber, which are provided with removable sealing caps for filling the chamber.

By providing separate zones for the mass and permitting the fluid to communicate between the zones, various types or stages of reactions may be effected during the passage of the reaction fluid through the mass. For example, the reaction chamber may contain a cracking catalyst of a particular type but varying in degree of activity in different zones, or one or more zones may contain a vaporizing catalyst and the others a cracking catalyst, or the chamber or one or more of its zones may be used for refining and contain a desulphurizing catalyst and/or a gum removing catalyst, or the vaporization, cracking and refining may be carried out progressively from the inlet to the outlet chamber. If it is desired to carry out in the same chamber reactions occurring at widely differing temperatures such as a cracking reaction between 790° and 900° F. near the inlet of the chamber and a refining reaction between 500° and 700° F. near the outlet it may be necessary to insulate the chamber for accurate control of the temperature which may be done by arranging a suitable heat insulating space or medium between the zones in the chamber.

The operation of this type of converter is similar to that explained in connection with the horizontal converter of Fig. 1, that is, either endothermic or exothermic reactions may be effected by passing the reaction fluid radially through the mass from the inner to the outer chamber or in the reverse direction or from near the center of the mass towards both the inner and outer chambers, while the temperature may be regulated with or without the provision of finned heat exchange tubes or the use of heat exchange medium of different temperatures or types.

It will be evident from the above description that the present invention has many advantages because of simplicity of the apparatus involved and the ease of operation to obtain beneficial results. The principle of operation to obtain a progressive variation of reaction conditions to maintain the desired uniformity in reactions may be effected in numerous ways and by various forms of apparatus.

The selected depth of bed or path of flow through the mass will depend on the particular catalytic material and type of reaction. Satisfactory results have been obtained in converters having a diameter of four to fourteen feet, while good results in converting high boiling hydrocarbons into lower boiling hydrocarbons by a catalytic endothermic reaction utilizing siliceous catalysts are obtained with a path of flow of the order of two and one-half to three and one-half feet. Variation in temperature conditions, when desired, of the mass or masses from the inlet to the outlet will usually not be in excess of 100° F. except when the converter is of large diameter and will depend largely on the particular reaction or reactions involved or the type or types of catalysts or contact masses employed. When a single reaction is involved, such as the catalytic cracking of higher boiling hydrocarbons, the range of temperature variation within the catalytic chamber will normally be of the order of 50° F.

The heat exchange medium for effecting control of the temperature of the mass may be a fluid which operates in two phases such as water, mercury or diphenyl or a medium which operates in a single phase and may be fused salts or salt mixtures, molten metals of low boiling point, and specifically fused mixtures of sodium nitrate and potassium nitrite or sodium nitrite and potassium nitrate.

The invention has a wide range of use in and adaptation to numerous reactions in vapor, liquid or mixed phase, for example the conversion and refining of hydrocarbons from crude oil, coal, shale, etc., the production of alcohols, ammonia, fatty acids, etc. and the oxidation of $SO_2$ into $SO_3$ and $CO$ into $CO_2$, the transformation of higher boiling point hydrocarbons into gasoline, kerosene and naphtha, the reforming of naphtha, polymerization of unsaturates, desulphurizing and refining of hydrocarbons and many other operations requiring the use of one or more contact masses.

What I claim is:

1. Apparatus for effecting chemical reactions comprising a cylindrical casing having an apertured side wall, an apertured conduit disposed concentrically of the casing and forming with said apertured side wall a reaction chamber for containing contact material, an outer chamber surrounding the apertured side wall for cooperating with said conduit in passing reactants across the reaction chamber, a plurality of groups of tubes, each group positioned concentrically around said conduit, said groups of tubes being spaced from each other and so constructed and arranged that each group conducts an independent stream of heat exchange medium in indirect heat exchange relation with contact material in the reaction chamber in order to maintain different portions of contact material at different temperatures.

2. Apparatus for effecting chemical reactions comprising a cylindrical casing having an apertured side wall, an apertured conduit disposed concentrically of the casing and forming with said apertured side wall a reaction chamber, apertured partitioning means in the reaction chamber disposed concentrically of the apertured conduit forming a plurality of concentric chambers each adapted to contain a contact mass of different catalytic activity, an outer chamber surrounding the apertured casing side wall for cooperating with the apertured conduit in passing reactants across the contact masses, a group of tubes in each of said concentric chambers disposed concentrically, each group being so constructed and arranged as to conduct an independent stream of heat exchange fluid in indirect heat exchange relation with contact mass in each of said concentric chambers to maintain each mass at a different temperature.

EUGÈNE J. HOUDRY.

CERTIFICATE OF CORRECTION.

March 17, 1942.

Patent No. 2,276,307.

EUGENE J. HOUDRY.

It is hereby certified that error appears in the printed specification of the above numbered patent requiring correction as follows: Page 1, first column, line 10, after the comma and before "enter" insert --or may--; line 26, for "otherd" read --other--; and second column, line 44, for "8-8" read --9-9 of--; and that the said Letters Patent should be read with this correction therein that the same may conform to the record of the case in the Patent Office.

Signed and sealed this 5th day of May, A. D. 1942.

Henry Van Arsdale,
Acting Commissioner of Patents.

(Seal)